US 8,625,499 B2

United States Patent
Tseng

(10) Patent No.: US 8,625,499 B2
(45) Date of Patent: Jan. 7, 2014

(54) METHOD AND APPARATUS FOR IMPROVING CONFIGURATIONS OF SERVING GRANTS FOR A USER EQUIPMENT IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 867 days.

(21) Appl. No.: 12/048,233

(22) Filed: Mar. 14, 2008

(65) Prior Publication Data

US 2008/0225764 A1 Sep. 18, 2008

Related U.S. Application Data

(60) Provisional application No. 60/894,695, filed on Mar. 14, 2007.

(51) Int. Cl.
*H04W 4/00* (2009.01)

(52) U.S. Cl.
USPC ............ 370/329; 370/335; 370/342; 370/230

(58) Field of Classification Search
USPC ......... 370/310, 319, 320, 321, 314, 206, 205, 370/208, 204, 212, 213, 338
See application file for complete search history.

(56) References Cited

U.S. PATENT DOCUMENTS

| | | | |
|---|---|---|---|
| 2003/0147371 A1 | 8/2003 | Choi et al. | |
| 2004/0081181 A1 | 4/2004 | Malkamaki | |
| 2006/0067229 A1 | 3/2006 | Frederiksen | |
| 2007/0025300 A1 | 2/2007 | Terry | |
| 2007/0036108 A1 | 2/2007 | Benoist | |
| 2007/0183359 A1* | 8/2007 | Chen et al. | 370/328 |
| 2007/0195809 A1 | 8/2007 | Blanz et al. | |
| 2007/0253388 A1* | 11/2007 | Pietraski | 370/338 |
| 2007/0297360 A1* | 12/2007 | Joachim et al. | 370/329 |
| 2009/0106619 A1 | 4/2009 | Onggosanusi | |
| 2010/0067459 A1 | 3/2010 | Goransson | |
| 2010/0208635 A1 | 8/2010 | Frederiksen et al. | |

FOREIGN PATENT DOCUMENTS

| | | |
|---|---|---|
| CN | 1477886 A | 2/2004 |
| CN | 1535041 A | 10/2004 |
| EP | 1 708 524 A1 | 10/2006 |

(Continued)

OTHER PUBLICATIONS

3GPP Universal Mobile Telecommunications System(UMTS); Multiplexing and channel coding (FDD)(3GPP TS 25.212 version 7.4.0 Release 7), Mar. 2007, cover page plus p. 1-101, XP014037877, ETSI,Sophia Antipolis Cedex—France.

(Continued)

*Primary Examiner* — Dady Chery
(74) *Attorney, Agent, or Firm* — Blue Capital Law Firm, P.C.

(57) ABSTRACT

A method of improving configurations of serving grants for a user equipment in a wireless communications system includes providing a scheduling grant table for configuring a serving grant value according to a reference value when a relative grant message is received. The reference value is determined according to a previously received absolute grant message. The method then includes setting a maximum scheduled grant value of the scheduling grant table to be equal to or greater than a maximum absolute grant value capable of being indicated by the absolute grant message.

18 Claims, 4 Drawing Sheets

(56) References Cited

FOREIGN PATENT DOCUMENTS

| | | | |
|---|---|---|---|
| JP | 2004536505 | A | 12/2004 |
| JP | 2006115358 | A | 4/2006 |
| JP | 2006246457 | A | 9/2006 |
| JP | 2006345501 | A | 12/2006 |
| JP | 200822561 | A | 1/2008 |
| JP | WO 2008050453 | A1 | 5/2008 |
| JP | 2008541596 | A | 11/2008 |
| KR | 20030067412 | | 8/2003 |
| KR | 20030067412 | A | 8/2003 |
| KR | 20030079631 | | 10/2003 |
| KR | 1020060121868 | A | 11/2006 |
| KR | 100663278 | | 1/2007 |
| KR | 1020070021725 | A | 2/2007 |
| KR | 1020070055004 | | 5/2007 |
| KR | 1020080084059 | A | 9/2008 |
| TW | 200635299 | A | 10/2006 |
| WO | 03001681 | | 1/2003 |
| WO | 2006120540 | A1 | 11/2006 |
| WO | 2006126079 | A2 | 11/2006 |
| WO | 2008050453 | A1 | 5/2008 |

OTHER PUBLICATIONS

Philips, HARQ process handling for Rel-7 FDD MIMO, Jan. 15-19, 2007, 3GPP TSG RAN WG2 Meeting #56 bis, Tdoc R2-070289,XP050133378, Sorrento,Italy.

Universal Mobile Telecommunications System(UMTS); Medium Access Control (MAC) protocol specification (3GPP TS 25.321 version 7.4.0 Release 7), Mar. 2007, cover page plus p. 1-131, XP014037915, ETSI, Sophia Antipolis Cedex—France.

Ericsson, "Signaling of Transport Block Sizes for HS-DSCH", 9.2.2 , Jun. 24-27, 2002, p. 1-13, TSG-RAN WG2 #30,Tdoc R2-0221668,XP 050096610,Turin, Italy.

Samsung,"Mapping between transport block size and 6-bit index value", Feb. 18-22, 2002,p. 1-4, 3GPP TSG-RAN WG2 meeting#27,Tdoc R2-020384,XP050119993,Orlando, U.S.A.

R1-071183 3GPP TSG-RAN WG1 Meeting #48, "Introduction of 16QAM for HSUPA", Feb. 2007.

R2-071085 3GPP TSG-RAN WG2 Meeting #57, "Introduction of 16QAM in 25.321", Feb. 2007.

R2-071089 3GPP TSG-RAN WG2 Meeting #57, "Introduction of 64QAM in MAC specification", Feb. 2007.

R2-071092 3GPP TSG-RAN WG2 Meeting #57, "Proposed CR to TS 25.331 [Rel-7] on Introducing MIMO in RRC specification", Feb. 2007.

3GPP TS 25.331 V7.3.0 (Dec. 2006), "Radio Resource Control (RRC) Protocol Specification (Release 7)", P314, P580, P581.

3GPP TS 25.321 V7.3.0 (Dec. 2006), "Medium Access Control (MAC) protocol specification (Release 7)".

Qualcomm Europe, Ericsson, Motorola, Philips, Alcatel-Lucent, Samsung, Introduction of 16QAM for HSUPA, 3GPP TSG-RAN WG1 Meeting #48, R1-071184, Feb. 12, 2007.

Ericsson, MIMO impacts on MAC in HSPA, TSG-RAN WG2 Meeting #56, Tdoc R2-063211, Riga, Latvia Nov. 6-10, 2006.

Ericsson, HS-SCCH part 2 for UTRA MIMO, 3GPP TSG-RAN WG1 #48, R1-071081, St Louis, MO, USA, Feb. 12-16, 2007.

Office Action on corresponding foreign application (CN 200810085348.X) from the State Intellectual Property Office of the PRC dated Apr. 13, 2011.

Non-Final Office Action on related patent application (U.S. Appl. No. 12/048,235) from USPTO dated Mar. 17, 2011.

Office Action on corresponding foreign application (TW 97109017) from TIPO dated Jun. 20. 2011.

Office Action on corresponding foreign application (TW 97109016) from TIPO dated Jul. 28, 2011.

\* cited by examiner

METHOD AND APPARATUS FOR IMPROVING CONFIGURATIONS OF SERVING GRANTS FOR A USER EQUIPMENT IN A WIRELESS COMMUNICATIONS SYSTEM

CROSS REFERENCE TO RELATED APPLICATIONS

This application claims the benefit of U.S. Provisional Application No. 60/894,695, filed on Mar. 14, 2007 and entitled "Method and Apparatus for improving the performance of high order modulation and MIMO in HSPA", the contents of which are incorporated herein by reference.

BACKGROUND OF THE INVENTION

1. Field of the Invention

The present invention relates to a method and apparatus for improving configurations of serving grants for a user equipment in a wireless communications system, and more particularly to a method and apparatus for improving configurations of serving grants for a user equipment in a high speed uplink packet access (HSUPA) system with 16 quadrature amplitude modulation (16 QAM) or higher order modulation capability.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting third generation mobile telecommunication technology, the prior art provides High Speed Downlink Package Access (HSDPA) and High Speed Uplink Package Access (HSUPA), which are used to increase bandwidth utility rate and package data processing efficiency to improve uplink/downlink transmission rate.

HSUPA increases upstream network performance, reduces transmission delay by rapid retransmission of erroneous data transmissions, and can adjust transmission rate based on channel quality. To realize this type of "power control," HSUPA adopts technologies such as NodeB Scheduling, Hybrid Automatic Repeat Request (HARQ), Soft Handover, and Short Frame Transmission. Correspondingly, the 3rd Generation Partnership Project (3GPP) defines an Enhanced Dedicated Transport Channel (E-DCH) for controlling operations of HSUPA. E-DCH introduces new physical layer channels, such as E-HICH, E-RGCH, E-AGCH, E-DPCCH, and E-DPDCH, which are used for transmitting HARQ ACK/NACK, Uplink Scheduling Information, Control Plane information, and User Plane information. Detailed definitions of the above can be found in the Medium Access Control (MAC) protocol specification, "3GPP TS 25.321 V7.3.0," and are not given here.

Through Node B Scheduling technology, a base station (Node B) is allowed to adjust transmission power, or Serving Grant (SG), of mobiles or user equipments (UEs) within its transmission range (cell), so as to control uplink transmission rate of the UEs. Referring to the aforementioned MAC protocol specification, the network can provide Relative Grant (RG) messages and Absolute Grant (AG) messages to a UE through an E-DCH Relative Grant Channel (E-RGCH) and an E-DCH Absolute Grant Channel (E-AGCH) respectively, so as to adjust the transmission grant of the UE.

The RG messages adjust the SG of the UE according to a state variable reference_ETPR (which is the previous SG value). Detailed description of the variable reference_ETPR can be found in the aforementioned MAC protocol specification, and is not given here. The RG messages can be divided into Serving Relative Grant (SRG) messages and Non-Serving Relative Grant (NSRG) messages. An SRG message is transmitted from a serving cell of a serving Radio Link Set (RLS), and allows a Node B scheduler to incrementally adjust the SG of a UE under its control through "UP", "DOWN" and "HOLD" commands. In addition, only one SRG command may be received at any one time. An NSRG message is transmitted from a non-serving Radio Link (RL), and allows neighboring Node B's to adjust the transmission rate of UEs that are not under their control in order to avoid overload situations. By definition, there could be multiple non-serving relative grant commands received by the MAC at any time. NSRG commands include "DOWN" and "HOLD."

Furthermore, a scheduling grant table (SG-table) is configured for a UE by upper layers to perform a serving grant update procedure when a RG message is received. The serving grant update procedure converts a previous SG value stored in the state variable reference_ETPR to a scheduled grant index in the SG-table, so as to set an SG value that the UE is allowed to use in the next transmission through commands carried by the RG message. According to the aforementioned MAC protocol specification, when the serving grant update procedure is performed, the UE shall determine a scheduled grant value larger than or equal to the previous SG value, i.e. the state variable reference_ETPR, in the SG-table and also determine a corresponding scheduled grant index as a basis to adjust the SG value of next transmission.

In comparison, the AG messages are used to adjust the transmission grant of the UE directly, and can be classified into two types: Primary and Secondary. A Primary AG message provides an uplink resource grant for a specified UE served by a cell. A Secondary AG message provides an uplink resource grant for a group of UEs served by the cell, so as to reduce signaling overhead. Similarly, an absolute grant value mapping table is configured in a UE by upper layers as well, which is utilized for mapping and setting the SG value of the next transmission according to an absolute grant index carried by a received AG message.

Please note that, the 3rd Generation Partnership Project (3GPP) newly introduces an SG-table and an absolute grant value mapping table in the aforementioned MAC protocol specification to support a high speed uplink packet access (HSUPA) system with 16 quadrature amplitude modulation (16 QAM) capability, in which the range of SG values are enlarged for significantly enhancing data transmission rate.

However, since a maximum absolute grant value in the new absolute grant value mapping table is higher than a maximum scheduled grant value in the new SG-table, some unexpected errors may occur when the UE receives a RG message and performs the serving grant update procedure. For example, when the UE receives an AG message with the maximum absolute grant value in some transmit time interval (TTI), the UE can then set the SG value of the next transmission to be the maximum absolute grant value (which is $(377/15)^2 \times 4$ in this case) and stores the used SG value (for example, the maximum absolute grant value) into the state variable reference_ETPR. After that, when a RG message (generally indicating "DOWN") is received, the UE shall perform the serving grant update procedure to correspondingly adjust the SG value of the next transmission. However, since the previous SG value stored in the variable reference_ETPR exceeds the maximum value of the new SG-table (which is $(376/15)^2 \times 4$ in this case), the UE cannot determine a scheduled grant value larger than or equal to the previous SG value and a corresponding scheduled grant index from the SG-table, so that the SG value of the next transmission cannot be set correctly, resulting in software errors.

SUMMARY OF THE INVENTION

According to the present invention, a method of improving configurations of serving grants for a user equipment in a wireless communications system is disclosed. The method comprises steps of providing a scheduling grant table for setting a serving grant value according to a reference value when a relative grant message is received, wherein the reference value is determined according to an absolute grant message, and configuring a maximum scheduling grant value of the scheduling grant table to be lager than or equal to a maximum absolute grant value capable of indicated by the absolute grant message before setting the serving grant value.

According to the present invention, a communications device of a wireless communications system utilized for improving configurations of serving grants is further disclosed. The communications device comprises a control circuit for realizing functions of the communications device, a processor installed in the control circuit, for executing a program code to operate the control circuit, and a memory coupled to the processor for storing the program code. The program code comprises providing a scheduling grant table for setting a serving grant value according to a reference value when a relative grant message is received, wherein the reference value is determined according to an absolute grant message, and configuring a maximum scheduling grant value of the scheduling grant table to be lager than or equal to a maximum absolute grant value capable of indicated by the absolute grant message before setting the serving grant value.

According to the present invention, a method of improving configurations of serving grants for a user equipment in a wireless communications system is further disclosed. The method comprises steps of providing a scheduling grant table and an absolute grant value mapping table and configuring a maximum value of the absolute grant value mapping table to be a maximum value of the scheduling grant table, wherein the scheduling grant table and the absolute grant value mapping table are used when the wireless communications system activates 16 quadrature amplitude modulation (16 QAM).

According to the present invention, a communications device of a wireless communications system utilized for improving configurations of serving grants is further disclosed. The communications device comprises a control circuit for realizing functions of the communications device, a processor installed in the control circuit, for executing a program code to operate the control circuit, and a memory coupled to the processor for storing the program code. The program code comprises providing a scheduling grant table and an absolute grant value mapping table and configuring a maximum value of the absolute grant value mapping table to be a maximum value of the scheduling grant table, wherein the scheduling grant table and the absolute grant value mapping table are used when the wireless communications system activates 16 quadrature amplitude modulation (16 QAM).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
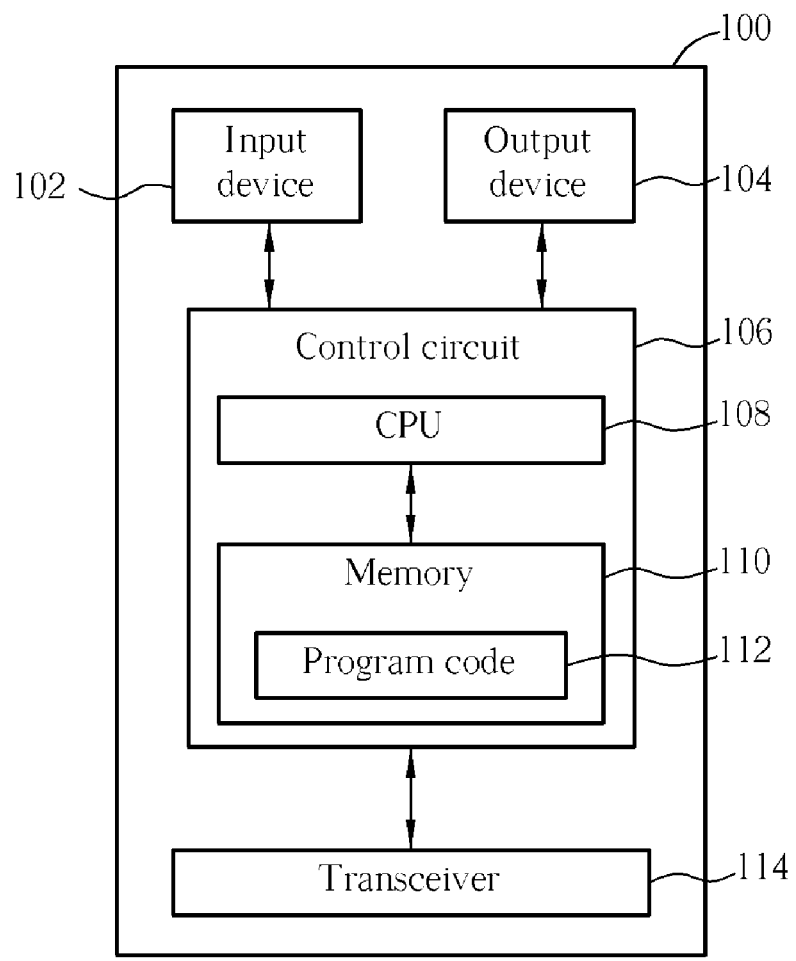
FIG. 1 is a function block diagram of a wireless communications device.
Figure 3:
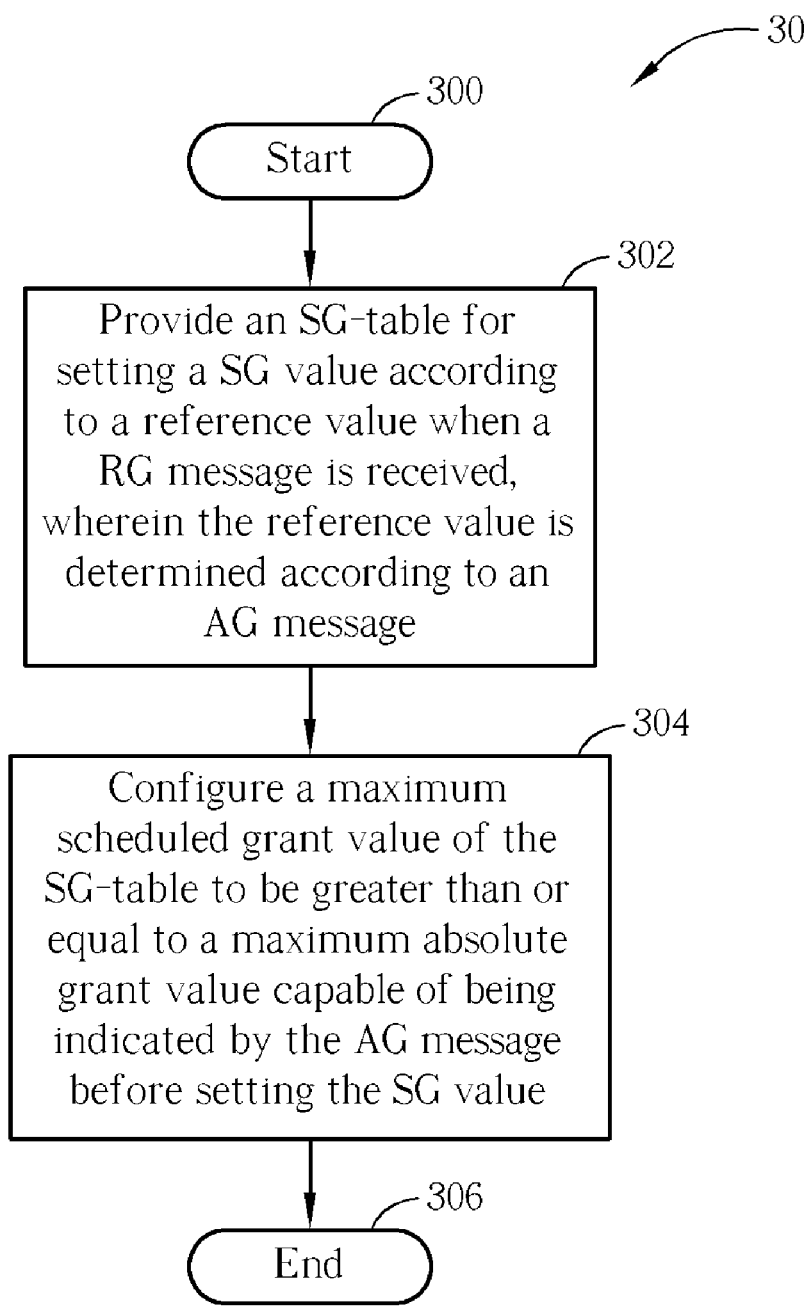
FIG. 3 is a flowchart of a process according to an embodiment of the present invention.

Please refer to FIG. 1, which is a functional block diagram of a communications device 100. For the sake of brevity, FIG. 3 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
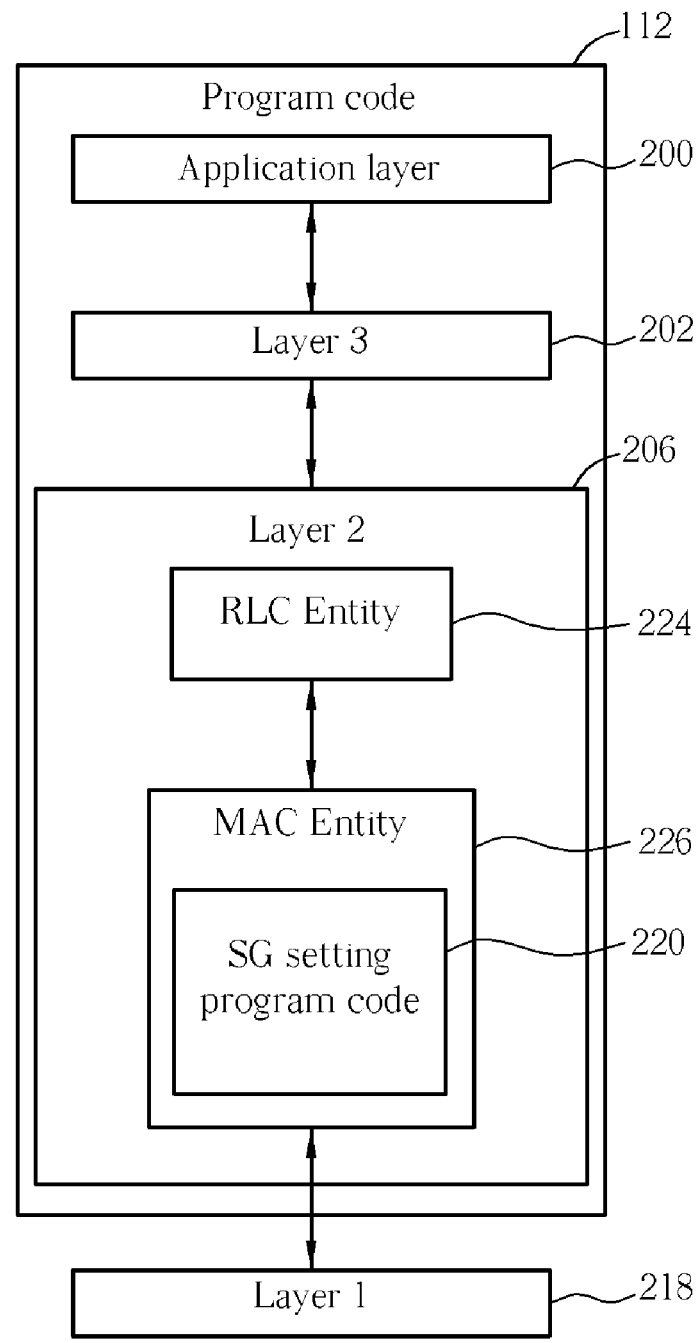
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

In some applications, such as when realizing high-speed uplink packet access (HSUPA) functions, the MAC entity 226 can adjust the transmission grant (Serving Grant, SG) of the communications device 100 according to a Relative Grant (RG) message sent from the network, in order to prevent system overload. In this situation, the embodiment of the present invention provides an SG setting program code 220 utilized for correctly setting SG values, in order to prevent occurrence of software errors. Please refer to FIG. 3, which is a flowchart diagram of a process 30 according to an embodiment of the present invention. The process 30 is utilized in a user equipment (UE) of a wireless communications system for improving configurations of SG values, and can be compiled into the SG setting program code 220. The process 30 comprises the following steps:

Step 300: Start.

Step 302: Provide a scheduling grant table (SG-table) for setting a SG value according to a reference value when a RG message is received, wherein the reference value is determined according to an absolute grant (AG) message.

Step 304: Configure a maximum scheduled grant value of the SG-table to be greater than or equal to a maximum absolute grant value capable of being indicated by the AG message before setting the SG value.

Step 306: End.

According to the process 30, before setting the SG value, the embodiment of the present invention configures a maximum scheduled grant value in the SG-table to be greater than or equal to a maximum absolute grant value capable of being indicated by the AG message, for allowing the UE to correctly execute a serving grant update procedure when the RG message is received, so as to prevent occurrence of software errors. Preferably, the reference value is a previous SG value stored in a state variable reference_ETPR, and the maximum absolute grant value capable of being indicated by the AG message is determined according to an absolute grant value mapping table. In the embodiment of the present invention, the SG-table and the absolute grant value mapping table are stored in the UE to support an HSUPA system with 16 quadrature amplitude modulation (16 QAM) or higher order modulation capability, and can be configured by upper layers.

In other words, the embodiment of the present invention configures the maximum scheduled grant value of the SG-table to be greater than or equal to the maximum absolute grant value of the absolute grant value mapping table, so as to set the SG values correctly. In some embodiments, the present invention can enlarge the maximum scheduled grant value of the SG-table to be greater than or equal to the maximum absolute grant value of the absolute grant value mapping table. Conversely, in other embodiments, the maximum absolute grant value of the absolute grant value mapping table may be reduced to achieve the same objective.

Figure 4:
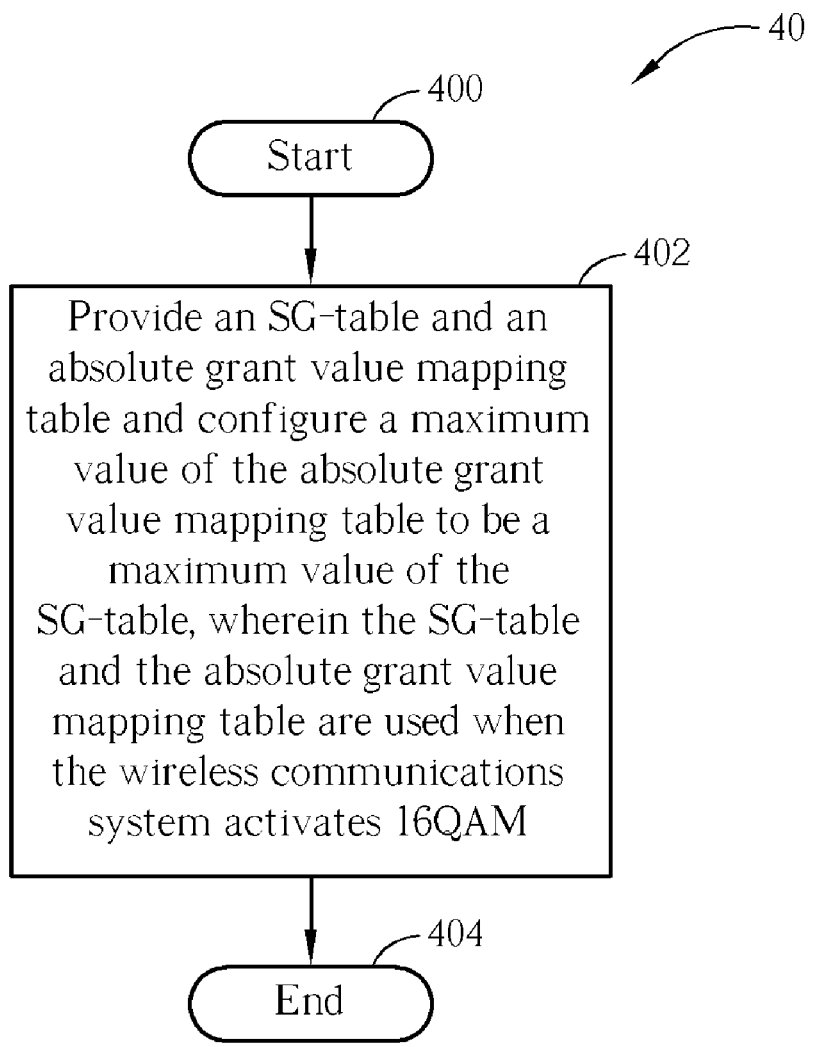
FIG. 4 is a flowchart of a process according to another embodiment of the present invention.

For example, please refer to FIG. 4. FIG. 4 illustrates a flowchart diagram of a process 40 according to another embodiment of the present invention. The process 40 is utilized in a UE of a wireless communications system for improving configurations of SG values, and may be compiled into the SG setting program code 220. The process 40 comprises the following steps:

Step 400: Start.

Step 402: Provide an SG-table and an absolute grant value mapping table and configure a maximum value of the absolute grant value mapping table to be a maximum value of the SG-table, wherein the SG-table and the absolute grant value mapping table are used when the wireless communications system activates 16 QAM.

Step 404: End.

Through the process 40, the embodiment of the present invention provides an SG-table and an absolute grant value mapping table utilized for supporting 16 QAM, and reduces the maximum value of the absolute grant value mapping table to be the maximum value of the SG-table. In this case, when the upper layers activate 16 QAM, the communications device 100 can use the SG-table and the absolute grant value mapping table to correctly set the SG values, so as to prevent occurrence of software errors.

Therefore, when the UE receives an RG message and performs the serving grant update procedure, the UE can correctly determine a scheduled grant value greater than or equal to the previous SG value (stored in the state variable reference_ETPR) and a corresponding scheduled grant index from the SG-table, so as to set the SG value of the next transmission.

Please note that the above embodiments are merely exemplary illustrations of the present invention, and those skilled in the art can certainly make appropriate modifications according to practical demands. For example, when the serving grant update procedure is performed, the embodiment of the present invention can further determine whether the previous SG value stored in the state variable reference_ETPR is greater than the maximum scheduled grant value in the SG-table. If so, the embodiment of the present invention can directly select a maximum scheduled grant index corresponding to the maximum scheduled grant value in the SG-table for executing the following serving grant update procedure. Such variation also belongs to the scope of the present invention.

As mentioned above, the embodiment of the present invention configures a maximum scheduled grant value in the SG-table to be greater than or equal to a maximum absolute grant value capable of being indicated by the AG message before setting the SG values, for correctly performing the serving grant update procedure when the RG message is received, so as to prevent occurrence of software errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving configurations of serving grants for a user equipment in a wireless communications system, the method comprising:

providing a scheduling grant table for setting a serving grant value according to a reference value, wherein the scheduling grant table has a maximum scheduling grant value, wherein the reference value is determined according to an absolute grant message, wherein the absolute grant message further indicates a maximum absolute grant value, and wherein the maximum absolute grant value is greater than the maximum scheduling grant value; and configuring the maximum scheduling grant value to be greater than or equal to the maximum absolute grant value before setting the serving grant value.

2. The method of claim 1, wherein setting the serving grant value according to the reference value comprises selecting a scheduling grant value greater than or equal to the reference value from the scheduling grant table as a basis for setting the serving grant value.

3. The method of claim 1, wherein the maximum absolute grant value is determined according to an absolute grant value mapping table.

4. The method of claim 3, wherein the absolute grant value mapping table is configured by upper layers.

5. The method of claim 1, wherein configuring the maximum scheduling grant value comprises increasing the maximum scheduling grant value.

6. The method of claim 1, wherein configuring the maximum scheduling grant value comprises reducing the maximum absolute grant value.

7. The method of claim 1, wherein the wireless communications system is a wireless communications system with high order modulation capability.

8. The method of claim 7, wherein the wireless communications system is a high speed uplink packet access (HSUPA) system with 16 quadrature amplitude modulation (16QAM) or higher order modulation capability.

9. A communications device of a wireless communications system utilized for improving configurations of serving grants, the communications device comprising:
- a control circuit for realizing functions of the communications device;
- a processor installed in the control circuit, for executing a program code to operate the control circuit; and
- a memory coupled to the processor for storing the program code;
- wherein the program code comprises:
    - providing a scheduling grant table for setting a serving grant value according to a reference value, wherein the scheduling giant table has a maximum scheduling grant value, wherein the reference value is determined according to an absolute grant message, wherein the absolute grant message further indicates a maximum absolute grant value, and wherein the maximum absolute grant value is greater than the maximum scheduling grant value; and
    - configuring the maximum scheduling grant value to be greater than or equal to the maximum absolute grant value before setting the serving grant value.

10. The communications device of claim 9, wherein setting the serving grant value according to the reference value comprises selecting a scheduling grant value greater than or equal to the reference value from the scheduling grant table as a basis for setting the serving grant value.

11. The communications device of claim 9, wherein the maximum absolute grant value is determined according to an absolute grant value mapping table.

12. The communications device of claim 11, wherein the absolute grant value mapping table is configured by upper layers.

13. The communications device of claim 9, wherein configuring the maximum scheduling grant value comprises increasing the maximum scheduling grant value.

14. The communications device of claim 9, wherein configuring the maximum scheduling grant value comprises reducing the maximum absolute grant value.

15. The communications device of claim 9, wherein the wireless communications system is a wireless communications system with high order modulation capability.

16. The communications device of claim 15, wherein the wireless communications system is a high speed uplink packet access (HSUPA) system with 16 quadrature amplitude modulation (16QAM) or higher order modulation capability.

17. A method of improving configurations of serving grants for a user equipment in a wireless communications system, the method comprising:
- providing a scheduling giant table and an absolute grant value mapping table, wherein the scheduling grant table and the absolute grant value mapping table are used when the wireless communications system activates 16 quadrature amplitude modulation (16QAM), and wherein a maximum value of the absolute grant value mapping table is greater than a maximum value of the scheduling grant table; and
- configuring the maximum value of the absolute grant value mapping table to be the maximum value of the scheduling grant table.

18. A communications device of a wireless communications system utilized for improving configurations of serving grants, the communications device comprising:
- a control circuit for realizing functions of the communications device;
- a processor installed in the control circuit, for executing a program code to operate the control circuit; and
- a memory coupled to the processor for storing the program code;
- wherein the program code comprises:
    - providing a scheduling grant table and an absolute grant value mapping table, wherein the scheduling grant table and the absolute grant value mapping table are used when the wireless communications system activates 16 quadrature amplitude modulation (16QAM), and wherein a maximum value of the absolute grant value mapping table is greater than a maximum value of the scheduling grant table; and
    - configuring the maximum value of the absolute grant value mapping table to be the maximum value of the scheduling grant table.

* * * * *